(12) United States Patent
Lim et al.

(10) Patent No.: US 10,651,520 B2
(45) Date of Patent: May 12, 2020

(54) BATTERY

(71) Applicants: Hyundai Motor Company, Seoul (KR); Kia Motors Corporation, Seoul (KR)

(72) Inventors: Hae Kyu Lim, Bucheon-si (KR); Yong Hwan Choi, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 103 days.

(21) Appl. No.: 15/997,491

(22) Filed: Jun. 4, 2018

(65) Prior Publication Data
US 2019/0148802 A1    May 16, 2019

(30) Foreign Application Priority Data
Nov. 13, 2017    (KR) .................. 10-2017-0150410

(51) Int. Cl.
| | |
|---|---|
| *H01M 4/02* | (2006.01) |
| *H01M 10/6556* | (2014.01) |
| *H01M 2/20* | (2006.01) |
| *H01M 10/613* | (2014.01) |
| *H01M 2/10* | (2006.01) |
| *H01M 2/02* | (2006.01) |

(52) U.S. Cl.
CPC ..... *H01M 10/6556* (2015.04); *H01M 2/1016* (2013.01); *H01M 2/1077* (2013.01); *H01M 2/202* (2013.01); *H01M 10/613* (2015.04); *H01M 2/0207* (2013.01)

(58) Field of Classification Search
CPC ...................................... H01M 4/02
See application file for complete search history.

(56) References Cited

U.S. PATENT DOCUMENTS

2017/0294693 A1*  10/2017  Tong ................... H01M 10/653

FOREIGN PATENT DOCUMENTS

| | | |
|---|---|---|
| KR | 10-2013-0121255 A | 11/2013 |
| KR | 10-2017-0029283 A | 3/2017 |

* cited by examiner

*Primary Examiner* — Jacobs B Marks
(74) *Attorney, Agent, or Firm* — Morgan, Lewis & Bockius LLP

(57) ABSTRACT

A battery apparatus may include a cell-stacked structure including a plurality of cells stacked in a horizontal direction, a first plate covering at least one of upper and lower end portions of the cell-stacked structure, and a thermal conductive adhesive interposed between the first plate and the upper or lower end portion of the cell-stacked structure covered by the first plate.

14 Claims, 6 Drawing Sheets

BATTERY

CROSS REFERENCE TO RELATED APPLICATION

The present application claims priority to Korean Patent Application No. 10-2017-0150410 filed on Nov. 13, 2017, the entire contents of which is incorporated herein for all purposes by this reference.

BACKGROUND OF THE PRESENT INVENTION

Field of the Invention

The present invention relates to a battery, and, more particularly, to a battery having further improved cooling performance in that it is configured for efficiently dissipating heat generated in a plurality of cells included therein while having a simplified structure.

Description of Related Art

Due to serious global warming and environmental pollution in recent years, eco-friendly vehicles have been actively researched and developed to greatly reduce environmental pollution and there is a growing market therefore in the field of vehicle industries.

The eco-friendly vehicles collectively refer to an electric vehicle, a hybrid vehicle, a plug-in hybrid vehicle, a fuel cell vehicle, etc., which include an electric motor (motor) configured to generate driving force using electrical energy, instead of or together with a conventional engine configured to generate driving force by burning fossil fuel.

Such an eco-friendly vehicle may include a battery as a component for storing electrical energy supplied to a motor since it generates driving force using the motor converting the electrical energy into kinetic energy.

The battery included in the vehicle has a typical structure in which a plurality of battery cells are connected in series to output high voltage, and heat generated when these cells are charged and discharged has a strong influence on the performance of the battery, and it is therefore necessary to effectively dissipate the heat.

To dissipate heat, a conventional battery is configured such that a plurality of pouch-structured cells are stacked, cooling fins made of metal material with high thermal conductivity are disposed between the cells facing each other such that heat generated in the cells is transferred downward of the stacked cells through the cooling fins, and, under the cells, the cooling fins are in contact through a thermal interface material (TIM) with cooling channels in which coolant flows.

However, since the conventional battery is of a structure cooled by an indirect cooling method of transferring heat generated between the facing surfaces of a cell and another cell, separate cooling fins are required. For the present reason, the energy density to volume/weight ratio is lowered due to an increase in size of the battery, and heat transfer performance through the cooling fins varies depending on a difference in surface pressure between facing cells. Hence, temperature variation may occur in the battery.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a battery configured for efficiently dissipating heat generated in a plurality of cells included therein while having a simplified structure.

In accordance with one aspect of the present invention, a battery may include a cell-stacked structure including a plurality of cells stacked in a horizontal direction thereof, a first plate covering at least one of vertical upper and lower end portions of the cell-stacked structure, and a thermal conductive adhesive located between the first plate and the vertical upper or lower end portion of the cell-stacked structure covered by the first plate.

The plurality of cells may be stacked to come into direct contact with each other.

The cell-stacked structure may further include a pair of cell covers disposed to come into contact with the outermost surfaces of the stacked cells, and a plurality of fixing pins fixed to the cell covers through some portion of each of the cells.

Each of the cells may be a pouch-type cell, and the some portion of the cell through which the fixing pins pass may be a seal of the pouch-type cell.

The battery may further include a second plate disposed outside each of the pair of cell covers and fixed to the first plate.

The thermal conductive adhesive may be in direct contact with upper or lower portions of the cells and with a lower or upper surface of the first plate.

The first plate may have an exposed surface which is in contact with a cooling channel in which a refrigerant flows.

In accordance with another aspect of the present invention, a battery may include a plate configured to be in contact with a cooling channel in which a refrigerant flows, and a plurality of cells attached to the plate by a thermal conductive adhesive therebetween.

The plurality of cells may be horizontally stacked to come into direct contact with each other.

The plate may be fixed to vertical upper or lower portions of the horizontally stacked cells.

Each of the cells may be a pouch-type cell, and the cells may be fixed to a pair of cell covers, disposed to come into contact with the outermost surfaces of the stacked cells, by fixing pins passing through seals of the pouch-type cells.

As apparent from the above description, it is possible to reduce the volume or weight of the battery since there is no demand for a separate cooling fin to transfer heat generated in each cell. Furthermore, since heat generated in the cell is transferred to the cooling channel through the closest path between the cell and the cooling channel, it is possible to enhance cooling performance by the shortening of the heat transfer path.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
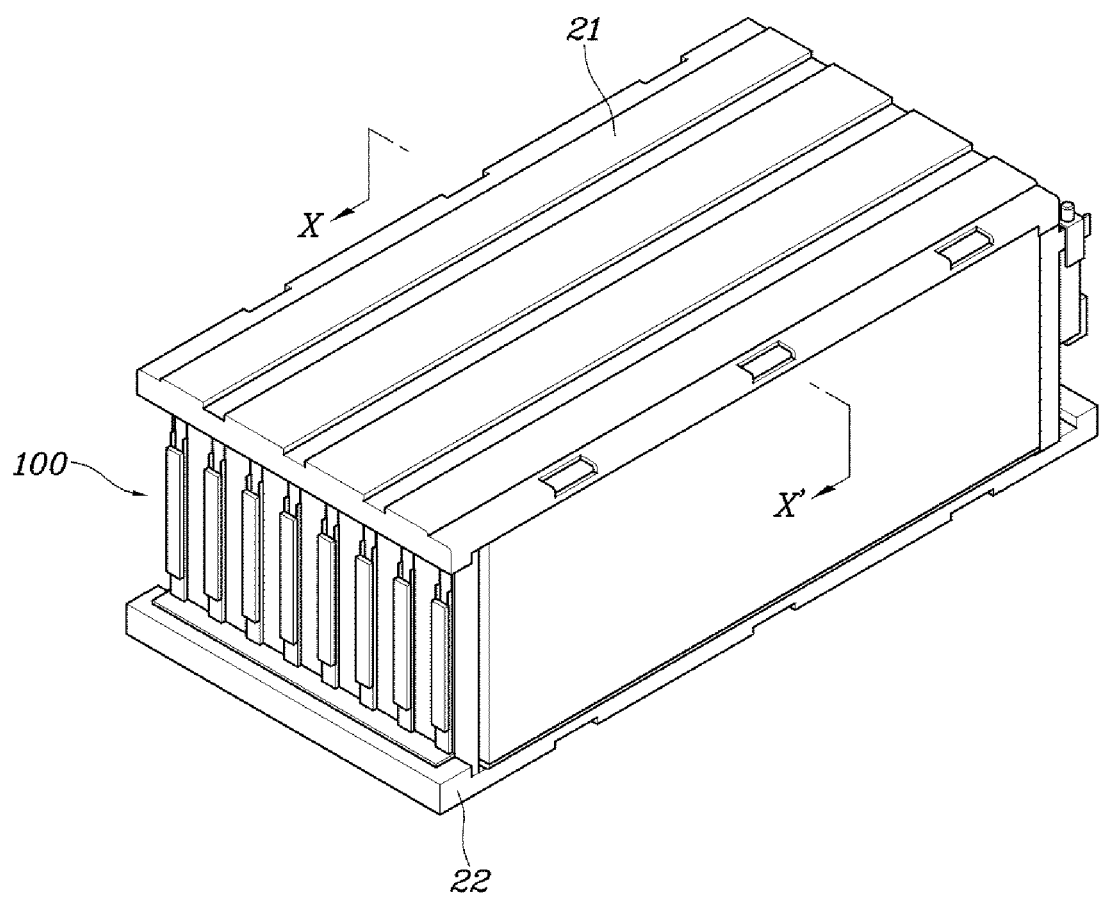
FIG. 1 is a perspective view illustrating a battery according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

A battery according to the exemplary embodiments of the present invention will be described below with reference to the accompanying drawings.

Figure 2:
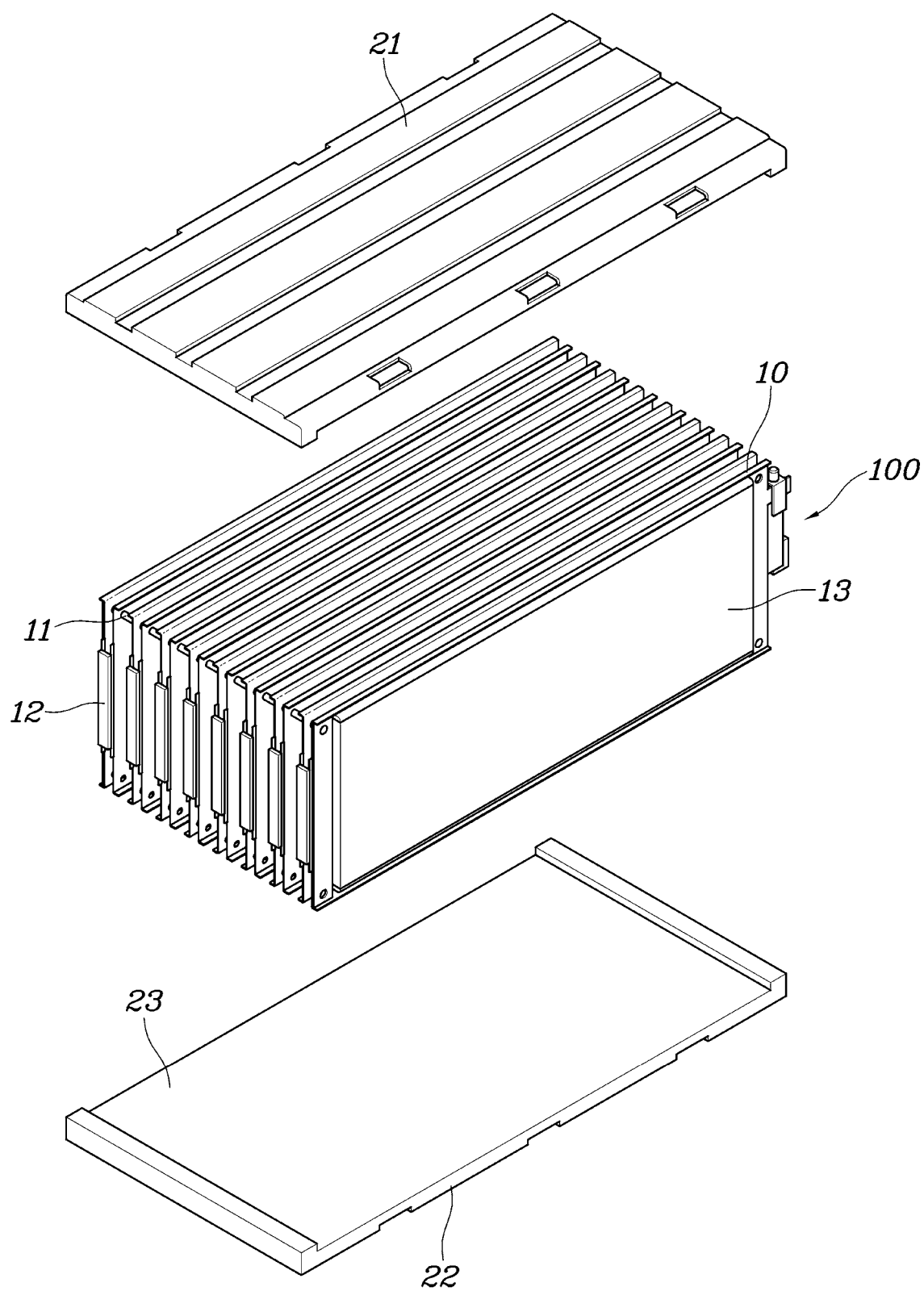
FIG. 2 is an exploded perspective view of the battery illustrated in FIG. 1.
Figure 3:
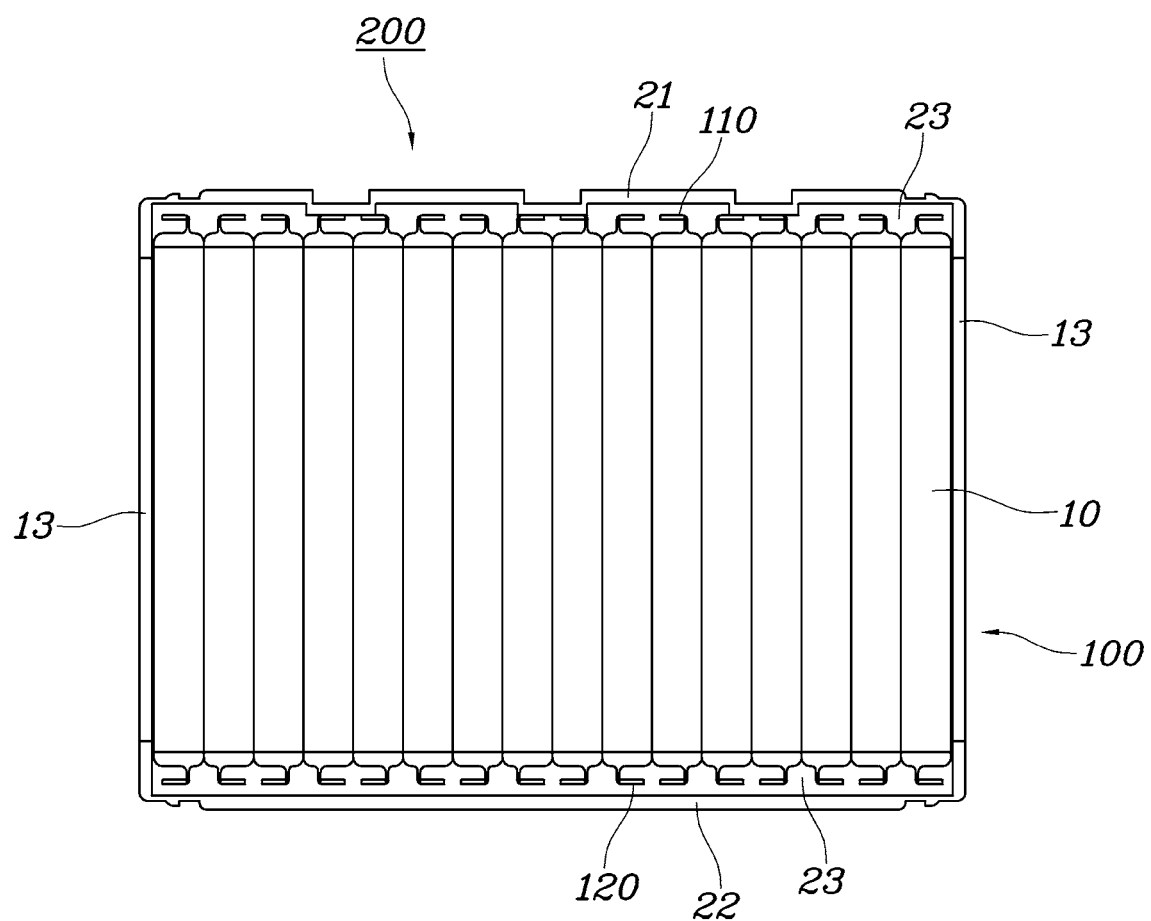
FIG. 3 is a cross-sectional view of the battery taken along line X-X' of FIG. 1.

FIG. 1 is a perspective view illustrating a battery according to an exemplary embodiment of the present invention. FIG. 2 is an exploded perspective view of the battery illustrated in FIG. 1. FIG. 3 is a cross-sectional view of the battery taken along line X-X' of FIG. 1.

Referring to FIG. 1, FIG. 2, and FIG. 3, the battery according to the exemplary embodiment of the present invention may include a cell-stacked structure 100 having a plurality of cells 10, upper and lower plates 21 and 22 that are respectively disposed above and under the cell-stacked structure 100, and a thermal conductive adhesive 23 which is located between the cell-stacked structure 100 and each of the upper and lower plates 21 and 22.

In an exemplary embodiment of the present invention, the position or direction of the structure will be described based on the direction illustrated in the accompanying drawings. For example, a plurality of cells 10 are described to be stacked in a horizontal direction thereof, and upper and lower plates 21 and 22 may be disposed in a vertical direction perpendicular to the horizontal direction thereof. It will be understood that the term "specific direction" such as "horizontal or vertical direction" does not limit the present invention as itself, but is a concept relative to the positions or directions of other components.

The cell-stacked structure 100 may include a plurality of cells 10 stacked in the horizontal direction thereof. The plurality of cells 10 may each be a pouch-type cell, and may be stacked in a form that comes into direct contact with each other. Plate-shaped cooling fins are additionally provided between the cells 10 in the related art, but the cells 10 are stacked in a form that comes into direct contact with each other without any cooling fin in an exemplary embodiment of the present invention.

Furthermore, the cell-stacked structure 100 may further include a pair of cell covers 13 disposed to come into contact with the outer surfaces of outermost cells among the stacked cells 10, and a plurality of fixing pins 11 fixed to the cell covers through some portion of each of the cells 10, in addition to the plurality of cells 10.

Figure 4:
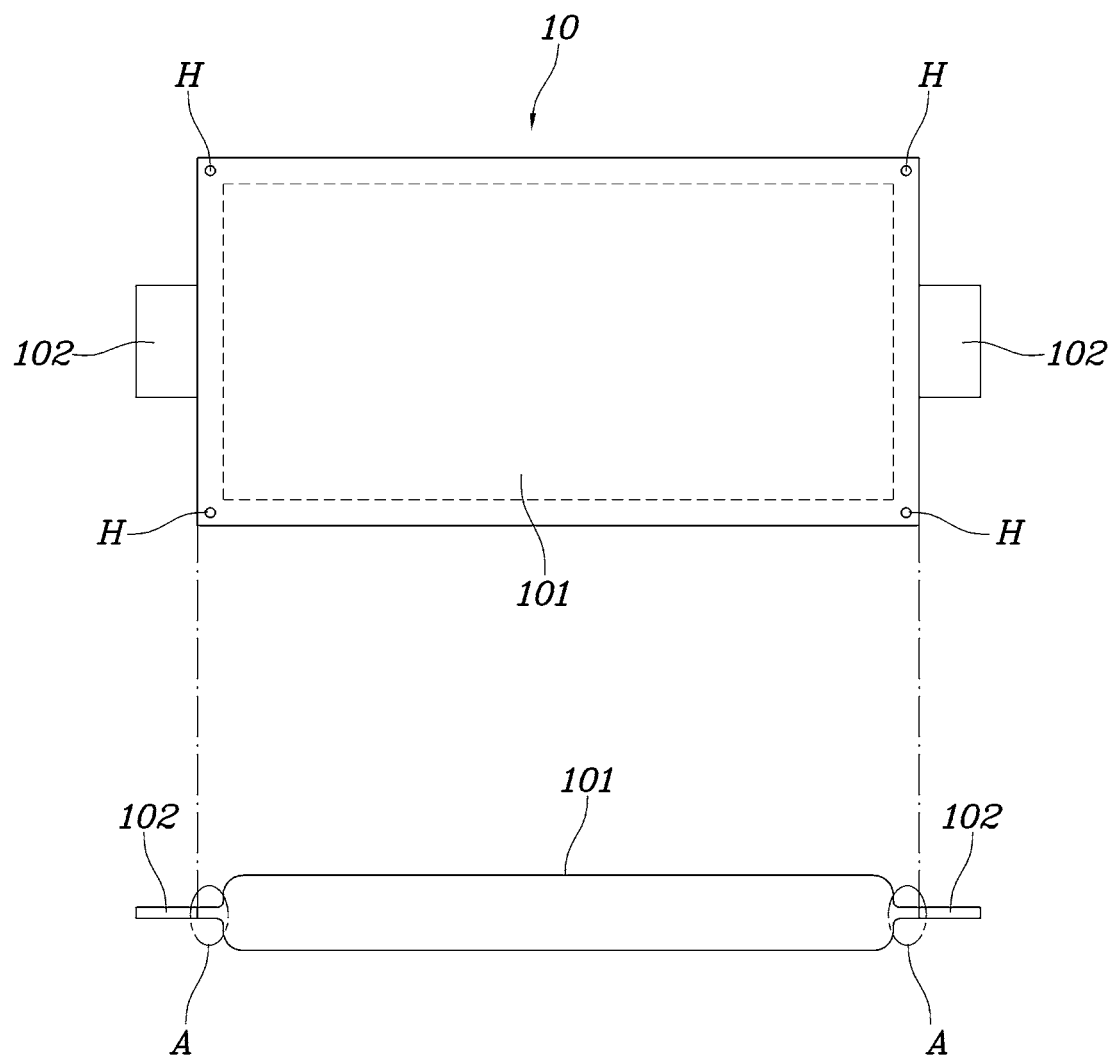
FIG. 4 is front and side views illustrating a pouch cell applied to the battery according to the exemplary embodiment of the present invention.

The structure of one of the cells included in the cell-stacked structure 100 is illustrated more specifically in FIG. 4. FIG. 4 is front and side views illustrating a pouch cell applied to the battery according to the exemplary embodiment of the present invention.

As illustrate in FIG. 4, the pouch cell 10 applied to the battery according to the exemplary embodiment of the present invention may include insulators 101 that enclose and seal a cell constituent substance storing electric power by chemical action. Leads 102 are exposed from both end portions of the insulators 101 to serve as terminals for supply of electrical energy. For the insulators 101 to seal the cell constituent substance, a seal A is formed by bonding the upper and lower insulators 101 therearound.

In the cell-stacked structure 100, one pouch cell 10 and a pouch cell adjacent thereto are stacked in the state in which the surface formed by each insulator 101 of the pouch cell 10 is in contact with the surface formed by the associated insulator of the adjacent pouch cell, and each lead 102 of the pouch cell 10 may be electrically connected to the associated lead of the adjacent pouch cell by a connection device 12 (e.g., by technique such as welding).

Furthermore, the seals of all pouch cells 10 included in the cell-stacked structure 100 may have through-holes H formed at the same position. The fixing pins 11 may pass through the through-holes H to align the stacked pouch cells 10. Furthermore, when both end portions of each fixing pin 11 are fixed to the cell covers 13 in the state in which a certain pressure is applied to the stacked pouch cells 10, a surface pressure may be applied to the stacked pouch cells 10.

The upper and lower plates 21 and 22 may cover the cell-stacked structure 100 in the vertical direction perpendicular to the horizontal direction in which the cells 10 are stacked. In the assembly process, the thermal conductive adhesives 23 may be previously applied to a certain thickness on the lower surface of the upper plate 21 and the upper surface of the lower plate 22, and the upper and lower plates 21 and 22 may be disposed above and under the cell-stacked structure 100 and be attached thereto such that the thermal conductive adhesives 23 are in direct contact with the cells 10.

That is, in exemplary embodiments of the present invention, the constituent battery cells 10 of the battery may be directly attached to the upper and lower plates 21 and 22, provided as external covers, without using medium other than the thermal conductive adhesives 23. In other words, the thermal conductive adhesives 23 may be in direct contact with the upper portions of the cells 10 and the lower surface of the upper plate 21 and with the lower portions of the cells 10 and the upper surface of the lower plate 22.

To easily dissipate heat through the contact between the upper or lower plate 21 or 22 and a cooling channel in which a refrigerant flows, each of the upper and lower plates 21 and 22 may also be manufactured of metal such as aluminum with high thermal conductivity or of thermal conductive plastic.

The thermal conductive adhesive 23 is an adhesive having excellent electrical insulating properties while having high thermal conductivity, and may include any of various known materials that satisfy required electrical insulation and heat dissipation specifications.

Figure 5:
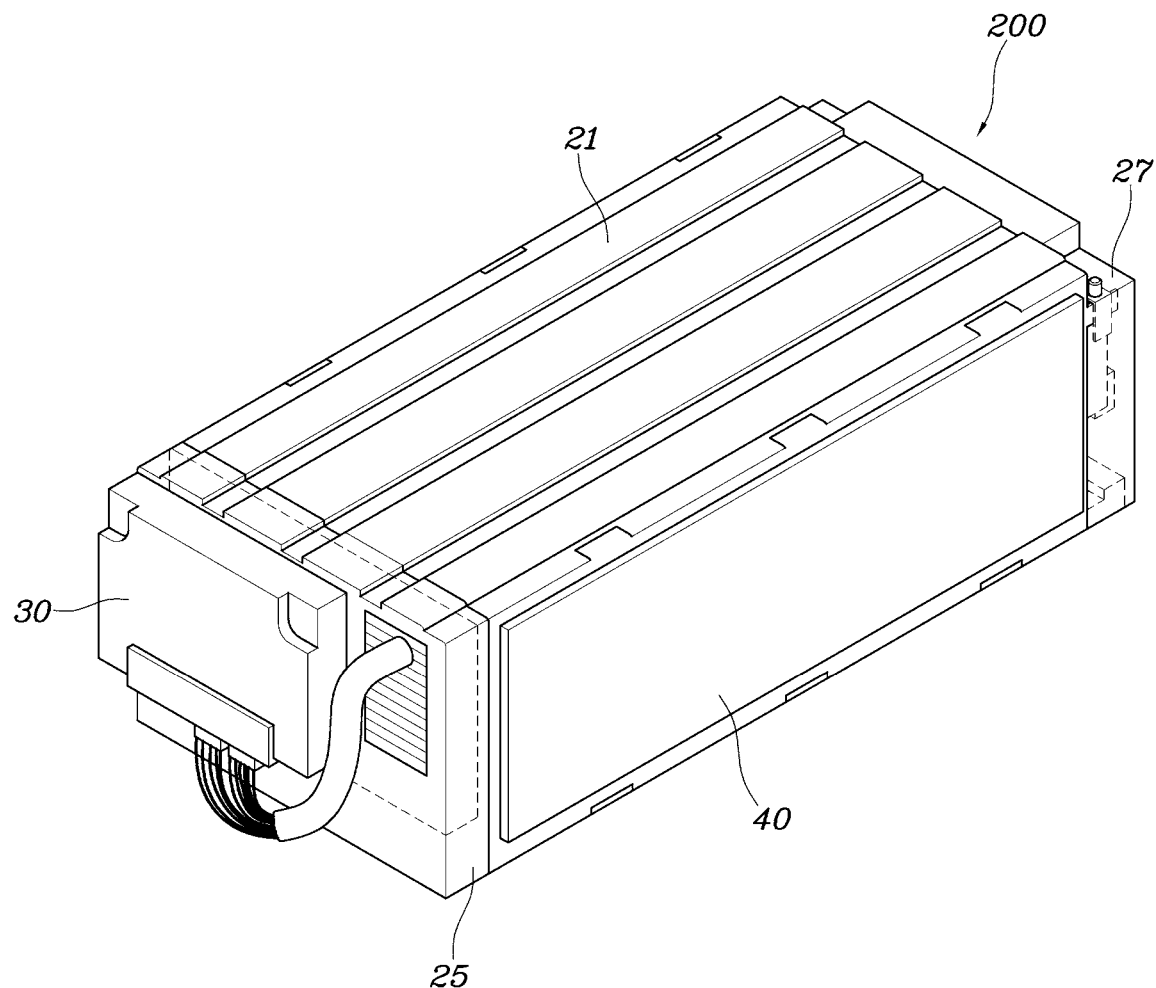
FIG. 5 is a perspective view illustrating a battery having additional components disposed to the battery of FIG. 1.

FIG. 5 is a perspective view illustrating a battery having additional components disposed to the battery of FIG. 1.

A battery illustrated in FIG. 5 may include a front plate 25 and a rear plate 27, wherein the front plate 25 is attached to the front portion of the upper plate 21 and the lower plate 22 and the rear plate 27 is attached to the rear portion of the upper plate 21 and the lower plate 22.

The battery illustrated in FIG. 5 may further include a controller 30 mounted to the front plate 25 and a side plate 40 that are additionally disposed to the battery illustrated in FIG. 1.

The controller 30 is a component which is disposed laterally of the stacked direction of the cells 10 to perform a predetermined control operation required for the battery in a response to the values obtained by detecting voltages and temperatures of cells. Although not illustrated in FIG. 5, sensors for detecting temperatures, voltages, currents, etc. of the cells 10 may be manufactured as a single assembly and disposed between the controller 30 and the cell-stacked structure 100.

Furthermore, the side plate 40 may include a pair of side plates disposed outside the cell covers 13 of the cell-stacked structure 100 and attached thereto to face the stacked surfaces of the cells 10. The side plates 40 may be fixed to the upper and lower plates 21 and 22, and may protect the battery and secure the robustness of the battery when the cells 10 are deformed due to swelling or an external force is applied to the battery.

In an exemplary embodiment of the presently claimed invention, the upper and lower edges 110 and 120 of the cell 10 are in a shape of "L" and embedded in the thermal conductive adhesive 23.

The battery, which may include the upper and lower plates disposed on the respective upper and lower end portions of the cell-stacked structure, described with reference to FIG. 1, FIG. 2, FIG. 3, FIG. 4, and FIG. 5 according to the exemplary embodiment of the present invention is by way of example only. As occasion demands, a plate may be disposed on one of the upper and lower end portions of the cell-stacked structure or one of the upper and lower end portions of the cell-stacked structure may be bonded to a plate adjacent thereto using a thermal conductive adhesive interposed therebetween.

The battery having the above-mentioned configuration according to the exemplary embodiments of the present invention can achieve a further improved heat dissipation effect, compared to the structure of the conventional battery.

Figure 6:
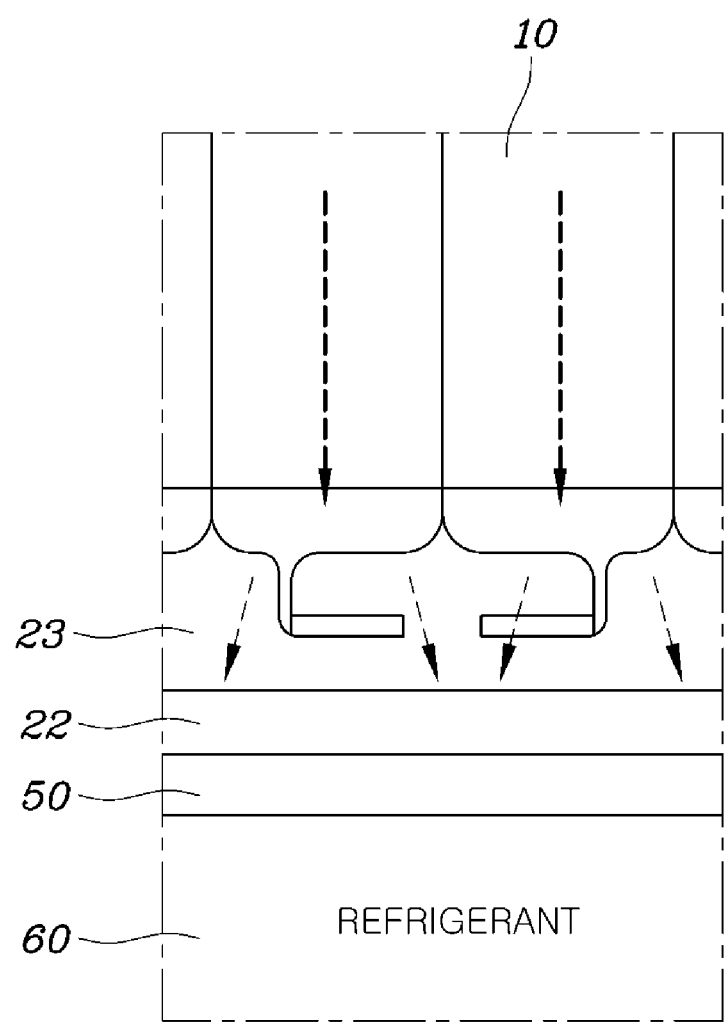
FIG. 6 is an expanded cross-sectional view for explaining a heat dissipation effect of the battery according to the exemplary embodiment of the present invention.

FIG. 6 is an expanded cross-sectional view for explaining the heat dissipation effect of the battery according to the exemplary embodiment of the present invention. Although FIG. 6 is an expanded view illustrating only a portion adjacent to the lower plate, the same effect may also be applied to a portion adjacent to the upper plate.

As illustrated in FIG. 6, the battery according to the exemplary embodiments of in various aspects of the present invention, the lower portion of each of the constituent cells 10 of the battery is in direct contact with the lower plate 22 through the thermal conductive adhesive 23. The lower surface of the lower plate 22 may be in contact with a cooling channel 60 in which a refrigerant flows. A thermal interface material (TIM) 50 may also be located between the lower plate 22 and the cooling channel 60.

That is, as indicated by dotted arrows in FIG. 6, the battery according to the exemplary embodiments of in various aspects of the present invention, heat generated in the cells 10 is not transferred to a remote cooling channel through any other medium such as radiation fins, but it is directly transferred to the cooling channel 60 through the thermal conductive adhesive 23 and the lower plate 22 that are in contact with some portion of the cell 10 closest to the cooling channel 60.

Accordingly, according to the exemplary embodiments of the present invention, it is possible to reduce the volume or weight of the battery since there is no demand for a separate cooling fin to transfer heat generated in each cell. Furthermore, since heat generated in the cell is transferred to the cooling channel through the closest path between the cell and the cooling channel, it is possible to enhance cooling performance by the shortening of the heat transfer path.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A battery apparatus comprising:
    a cell-stacked structure including a plurality of cells stacked in a horizontal direction thereof;
    a first plate covering at least one of upper and lower end portions of the cell-stacked structure; and
    a thermal conductive adhesive located between the first plate and the upper or lower end portion of the cell-stacked structure covered by the first plate,
    wherein the cell-stacked structure further includes a pair of cell covers disposed to contact with an external surface of outermost cells among the stacked cells, and a plurality of fixing pins fixed to the cell covers through a portion of each of the cells.

2. The battery apparatus according to claim 1, wherein the plurality of cells are stacked to come into direct contact with each other.

3. The battery apparatus according to claim 1, wherein each of the cells is a pouch-type cell, and the portion of each of the cells through which the fixing pins pass is a seal of the pouch-type cell.

4. The battery apparatus according to claim 1, further including a second plate mounted to each of the pair of cell covers and fixed to the first plate.

5. The battery apparatus according to claim 1, wherein the thermal conductive adhesive is in direct contact with upper or lower portions of the cells and with a lower or upper surface of the first plate.

6. The battery apparatus according to claim 1, wherein the first plate has an exposed surface which is in contact with a cooling channel in which a refrigerant flows.

7. The battery apparatus according to claim 6, wherein a thermal interface material is disposed between the first plate and the cooling channel.

8. The battery apparatus according to claim 6, wherein upper and lower edges of the cells are in a shape of "L" and embedded in the thermal conductive adhesive.

9. The battery apparatus according to claim 1, wherein adjacent leads of the cells are electrically connected to each other by a connection device.

10. The battery apparatus according to claim 1, wherein a front plate and a rear plate are mooned to a first end portion and a second end portion of the first plate, respectively.

11. A battery apparatus comprising:
a plate being in contact with a cooling channel in which a refrigerant flows therethrough; and
a plurality of cells attached to the plate by a thermal conductive adhesive therebetween.

12. The battery apparatus according to claim 11, wherein the plurality of cells are horizontally stacked to come into direct contact with each other.

13. The battery apparatus according to claim 12, wherein the plate is fixed to upper or lower portions of the cells.

14. The battery apparatus according to claim 13, wherein each of the cells is a pouch-type cell, and the cells are fixed to a pair of cell covers which are disposed to contact with external surfaces of outmost cells among the cells, by fixing pins passing through seals of the pouch-type cell.

* * * * *